United States Patent [19]

Koster et al.

[11] Patent Number: 5,349,880
[45] Date of Patent: Sep. 27, 1994

[54] TRANSMISSION WITH VARIABLE MECHANICAL PRESTRESS

[75] Inventors: Marinus P. Koster; Casparus W. Kruijer, both of Eindhoven, Netherlands

[73] Assignee: U.S. Philips Corporation, New York, N.Y.

[21] Appl. No.: 6,090

[22] Filed: Jan. 19, 1993

[30] Foreign Application Priority Data

Jan. 24, 1992 [EP]  European Pat. Off. ........ 92200193.8

[51] Int. Cl.$^5$ ............................................. F16H 57/12
[52] U.S. Cl. .................................... 74/399; 74/398; 74/409
[58] Field of Search ................. 74/398, 399, 402, 403, 74/409

[56] References Cited

U.S. PATENT DOCUMENTS

| 3,461,734 | 8/1969 | Durand | 74/409 X |
| 4,693,130 | 9/1987 | Kotzur | 74/397 |

FOREIGN PATENT DOCUMENTS

| 705178 | 12/1979 | U.S.S.R. | 74/409 |
| 800463 | 1/1981 | U.S.S.R. | 74/398 |

OTHER PUBLICATIONS

IBM Technical Disclosure Bulletin, vol. 23 No. 3 Aug. 1980 "Anti-Backlash Motor Mounting", T. G. Survant. "Constructieprincipes Bedoeld Voor Het Nauwkeurig Bewegen En Positioneren", by M. P. Koster, Mechanical Engineering Faculty of the University of Technology, Eindhoven, The Netherlands, Jan. 1990, No. V 2.3.6, p. 104.

*Primary Examiner*—Allan D. Herrmann
*Attorney, Agent, or Firm*—Laurie E. Gathman

[57] ABSTRACT

A transmission with variable mechanical prestress including a pinion driven by an electric motor, a driven gearwheel with its bearings in a housing, and an electromagnetic actuator for applying a prestress force which is controllable in dependence on an instantaneous load to be handled by the transmission. The electric motor with the pinion is supported so that it can be tilted relative to the housing. Owing to a tilting movement of the electric motor caused by the actuator, the pinion is pressed against the gearwheel with a certain prestress force in a radial direction. The transmission is free from play, while the virtual play arising from friction and hysteresis is strongly reduced, and the positioning accuracy is enhanced as a result.

17 Claims, 4 Drawing Sheets

TRANSMISSION WITH VARIABLE MECHANICAL PRESTRESS

FIELD OF THE INVENTION

The invention relates to a transmission with variable mechanical prestress comprising a toothed drive element driven by an electric motor and a toothed driven element cooperating with the drive element, at least one of the two elements being rotatable, and comprising an electromagnetic actuator for applying a prestress force which is controllable in dependence on a load to be instantaneously transmitted, whereby the toothed elements are pressed against one another with the flanks of their mutually engaging teeth.

DESCRIPTION OF THE PRIOR ART

Mechanisms driven by electric motors are often used where accurate movements and positionings are essential. In many cases, comparatively quick movements must also be carried out with these mechanisms. The electric motor and the load should then be optimally adapted to one another. Various possibilities are available for this. A first possibility is that an electric motor specially manufactured for the envisaged speed and power range is used. This specially manufactured electric motor, however, is costly. A second possibility is to buy a commercially available electric motor and to adapt it to the load by use of a gear transmission. In this latter case, however, the play and the friction in the transmission are felt to be disadvantageous.

Gearwheels have dimensional deviations owing to manufacturing defects. In general, therefore, a certain clearance is necessary for having a gear transmission function. This clearance, however, leads to a decrease in the positioning accuracy. Methods have accordingly been devised for compensating this clearance by force application in that the gearwheels are mechanically prestressed, i.e. a prestress force is applied to the gearwheels. This prestress force must be such that the clearance path is not traversed at the maximum load and when the load is reversed. As a result, the prestress force is generally too high during normal operation. Especially at low loads, i.e. at low speeds and low acceleration, there is an excess prestress force and, as a result, comparatively high friction.

In gear transmissions there is a sliding effect in those points where there is contact between the teeth. The sliding effect together with the prestress force causes additional friction in the contact points. This friction leads to hysteresis which results in a so-called virtual play. This hysteresis or virtual play reduces the positioning accuracy.

The invention relates to the widely used gear transmissions with straight or sloping teeth, to gear transmissions with helical gears, to wormwheel transmissions, to rack-and-pinion transmissions, and in general to transmissions in which at least one of the toothed elements has rotation bearings.

A transmission as described in the opening paragraph is known from the publication "Constructieprincipes" ("Construction Principles") issued by the Mechanical Engineering Faculty of the University of Technology, Eindhoven, January 1990, by M. P. Koster, no. V 2.3.6, page 104: "Spelingsvrije overbrenging met variabele voorspanning" ("Play-free transmission with variable prestress").

In this known transmission, two gearwheels are prestressed relative to one another in circumferential direction hydraulically or by an electromagnetic actuator, the two gearwheels being in engagement with a common pinion. The hydraulic version has the disadvantage that the seals necessary for hydraulic systems are somewhat elastic and cause friction. The mechanical version has the disadvantage that the electromagnetic actuator must be mounted on one of the two rotating gearwheels, since the tangential prestress must be controllable during rotation. A co-travelling actuator, however, is difficult to realize because of the electric current supply arrangements. In addition, the load is transmitted to the pinion through only one of the two gearwheels. The dimensions and the mass inertia must be small, while nevertheless a considerable force must be exerted. The mass inertia must be kept small because the actuator is mounted on a rotating part, and thus must follow all accelerations.

SUMMARY OF THE INVENTION

The invention has for its object to provide a transmission which does not exhibit these disadvantages and which is play-free, low in friction and low in hysteresis, so that it has a small virtual play, whereby the positioning accuracy compare with conventional transmissions is improved.

According to the invention, this object is substantially achieved in that the one element has its bearings in a stationary housing and the other element has its bearings in a block which is movable relative to the housing, while the two elements can be pressed against one another in radial direction by use of the actuator for generating the prestress force. The prestress force can be provided in a simple manner in that the two elements are pressed against one another in radial direction because this prestress force acts between the block to be moved and the stationary housing. Thanks to the indicated measures, the actuator can be placed on the stationary housing, so that the supply of electric current can take place without problems.

By controlling the prestress force in dependence on the load in the transmission, this force can be adapted to the instantaneous need. A high prestress force is necessary for keeping the play equal to zero at great loads in the transmission. During positioning, when the speeds and accelerations are almost zero, a low prestress force is sufficient, so that the positioning error resulting from hysteresis is as small as possible. Gear tooth errors may result in a relative displacement of the two elements in radial direction against the applied prestress force.

It is noted that the expression "radial direction" used above is understood to mean a direction perpendicular or substantially perpendicular to the centerline of the rotatable element, whereby relative displacements of the two elements lead to a variation in their relative distance, as opposed to the tangential direction.

A special embodiment of the transmission according to the invention, comprising a pinion on an input shaft and a gearwheel on an output shaft which is parallel to the input shaft, is characterized in that the gearwheel with the output shaft has its bearings in the housing and the pinion is provided on the motor shaft of the electric motor, while the electric motor is tiltable relative to the housing about a pivot axis which is directed transverse to the plane through the motor shaft and the output shaft.

The two elements, pinion and gearwheel, could be displaced relative to one another in radial direction, for example, by a parallel guide. Since the electric motor with the pinion is mounted with tilting possibility according to the measures in the characteristic, however, a smaller mass to be displaced is obtained compared with a parallel displacement. In addition, the driven output shaft rotates more slowly than the motor shaft and is also heavier. Moreover, the output shaft generally forms past of a driven mechanism.

The angles enclosed by the gearwheels as a result of the tilting movement are so small that the tilting movement approximates a pure parallel movement with sufficient accuracy.

The electric motor may be provided, for example, on a hinge pin with rotation possibility to achieve the tilting movement, which hinge pin is connected to the stationary housing. Such hinge constructions, however, always have some play. This disadvantage is counteracted in another embodiment of the transmission according to the invention in that the electric motor is coupled to the stationary housing with relative movement possibility by two pairs of blade springs which form a cross spring pivot. These measures provide a frictionless, play-free and low-hysteresis suspension of the electric motor which is rotatable about one axis and which has a comparatively high rigidity in all other directions.

In a further preferred embodiment of the transmission according to the invention, the electromagnetic actuator is constructed as an electromagnet of the EI type with an E-shaped yoke and an I-shaped armature, the E-shaped yoke being fastened on the stationary housing together with a coil and the I-shaped armature being provided on the motor housing of the electric motor. Electromagnets of the EI type are of compact dimensions and have a comparatively high force density. The prestress force may be varied in that it is ensured that a current in the coil is a function of the instantaneous load in the transmission. The armature exerts the actuator force on the gearwheels.

According to another embodiment of the transmission, the transmission includes a control circuit for controlling the prestress force, which control circuit is provided with a differential circuit for determining the difference between a signal depending on the motor current and a signal depending on the motor acceleration. The control circuit is further provided with a summation circuit for determining the sum of a signal supplied by the differential circuit and a signal depending on the motor speed, and which control circuit is also provided with an amplifier for converting a signal supplied by the summation circuit into an actuator current for energizing the actuator. The required prestress force depends on the power to be transmitted and on gear tooth errors. The gear tooth errors give rise to a radial force as a function of the motor speed and the teeth frequency. The gear tooth errors cause the effect that the mechanical system can be brought into resonance during operation. The prestress around the critical speeds at which the mechanical system will vibrate in its natural frequency must accordingly be greater than at other speeds. The required prestress as a function of the motor speed can be experimentally determined. The prestress force also depends on the power to be transmitted. The actuator current to be supplied to the actuator, therefore, is a function of the current supplied to the motor. Part of the motor current is used for accelerating the rotor of the motor. This part of the motor current does not contribute to the power to be transmitted and should therefore be subtracted from the motor current. If the motor current is not corrected in this manner, a too great prestress force will be applied during acceleration.

When an electromagnet of the EI type is used as the actuator, the prestress force $F_{actuator}$ to be provided by the actuator for a comparatively small displacement between yoke and armature depends on the actuator current $I_{actuator}$ as follows:

$$F_{actuator} = C * I_{actuator}^2$$

in which C is a constant. To obtain a linear relationship between the motor current and the force $F_{actuator}$ in an embodiment of the transmission according to the invention, the control circuit is provided with a root extractor circuit connected between the differential circuit and the summation circuit for determining the square root of the signal supplied by the differential circuit. The signal supplied by the differential circuit is a measure for the relevant motor current. By taking the square root of this signal and then supplying this signal to the actuator, a linear relationship between the prestress force and the motor current is obtained.

The transmission according to the invention may be used in constructions which serve for accurate positioning and/or accurate following of a path.

BRIEF DESCRIPTION OF THE DRAWINGS

The invention will be explained in more detail with reference to the drawings, in which.

DETAILED DESCRIPTION OF THE PREFERRED EMBODIMENTS

Figure 1:
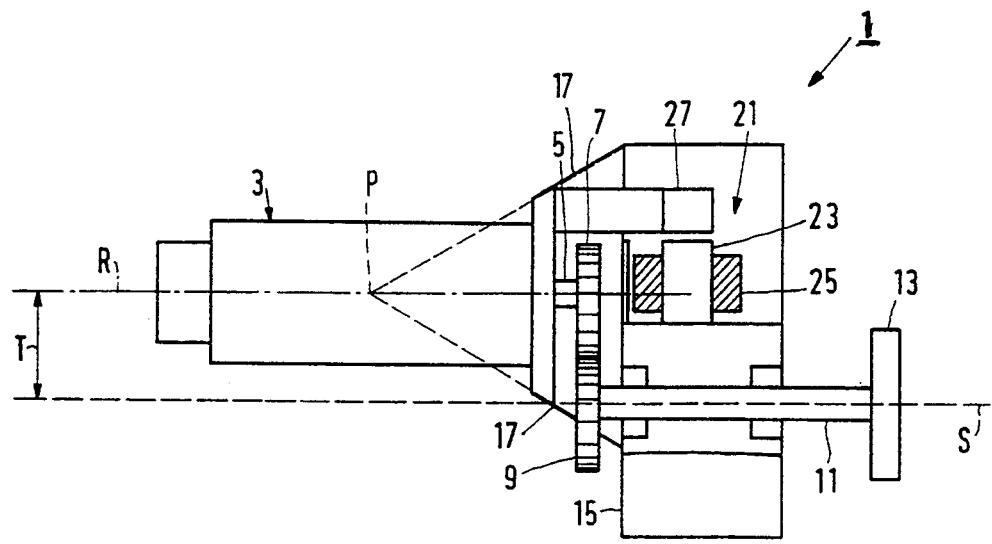
FIG. 1 diagrammatically shows an embodiment of the transmission in side elevation and partly in longitudinal section.

FIG. 1 shows a transmission 1 including an electric motor 3 with a motor shaft 5 on which a gearwheel 7 is fastened which is in engagement with a gearwheel 9 provided on a driven output shaft 11. The electric motor 3 may be a servomotor. Reference numeral 13 denotes a load on the output shaft 11. The driven gearwheel 9 with the output shaft 11 has its rotation bearings in a stationary housing 15. The servomotor 3 is smoothably suspended from the housing 15 by two pairs of parallel blade springs 17 constructed as a cross-spring pivot and is tiltable relative to the housing 15 about the pivot P which lies on the virtual hinge axis formed by the line of intersection of the blade springs 17. An electromagnetic actuator 21 comprises a yoke 23 with a coil 25 fastened on the housing 15 and an armature 27 provided on the servomotor 3. To apply a prestress force to the gearwheels 7 and 9, a controlled current through the coil 25 exerts a controlled attraction force on the movable armature 27, so that the servomotor 3 which is tillable about the pivot P, and thus the gearwheel 7 on the motor shaft 5, is pressed against the gearwheel 9 with a controlled prestress force in a radial direction. The centerline of the motor shaft 5 has reference R, while S denotes the centerline of the output shaft 11. T is the center-to-center distance between the two centerlines, so between the shafts. The control of the prestress force will be explained in more detail below with reference to FIG. 8.

Figure 2:
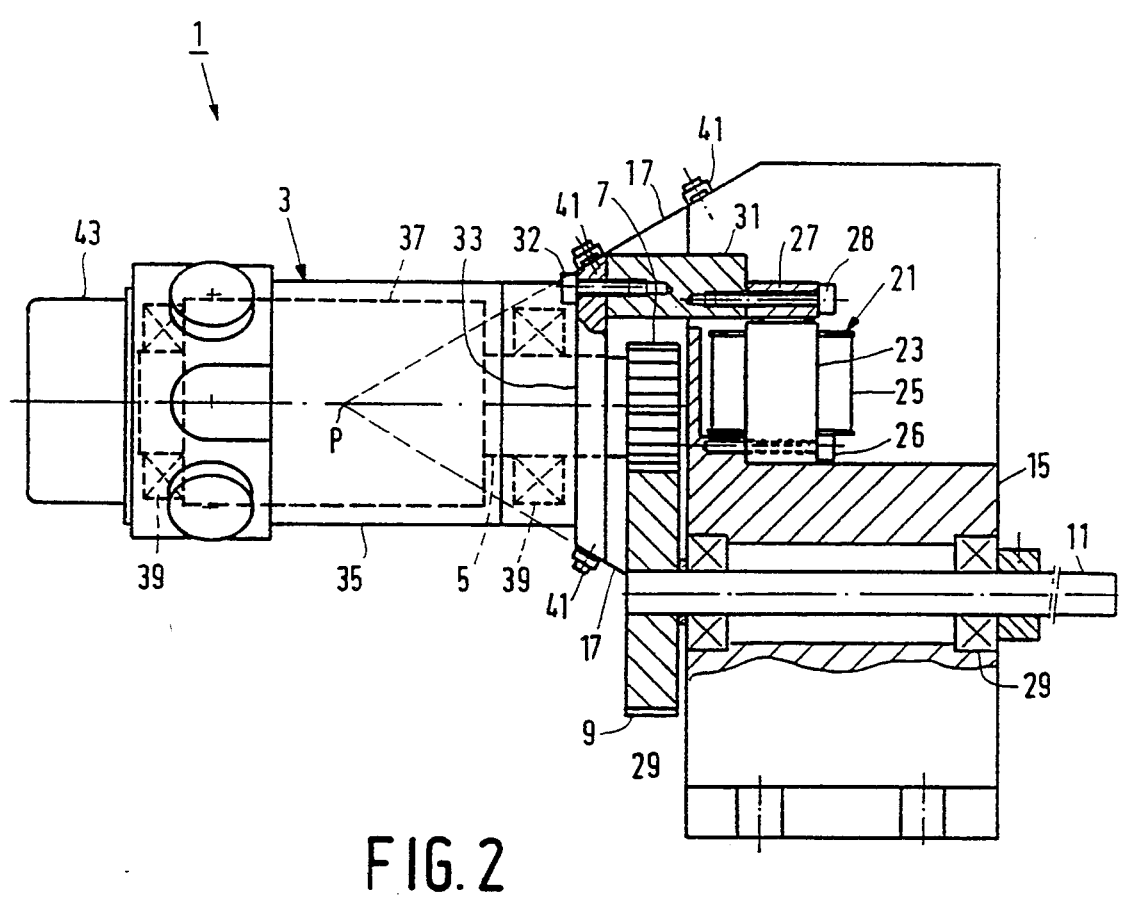
FIG. 2 shows a practical embodiment of the transmission according to the invention in side elevation and longitudinal section.
Figure 3:
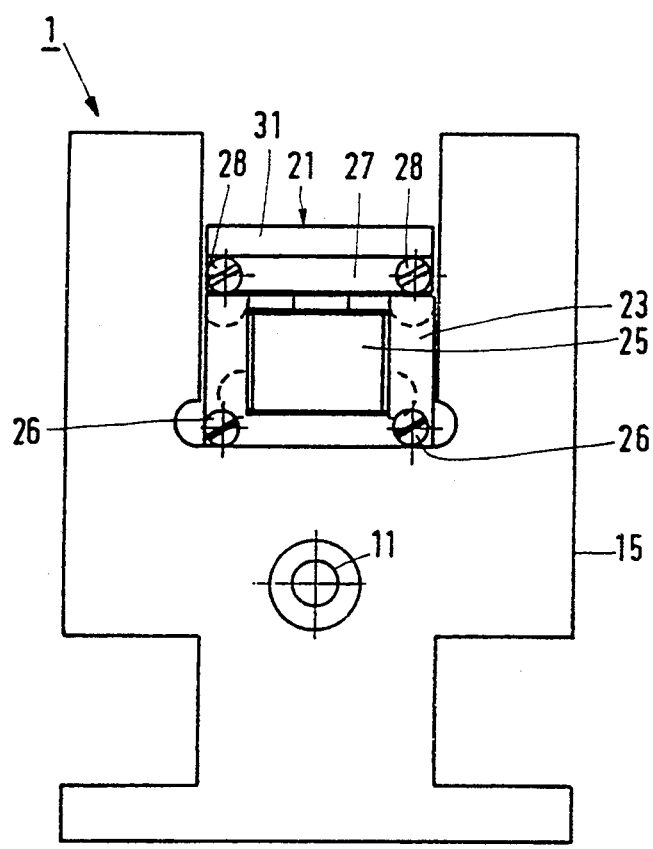
FIG. 3 shows the transmission of FIG. 2 in front elevation.
Figure 4:
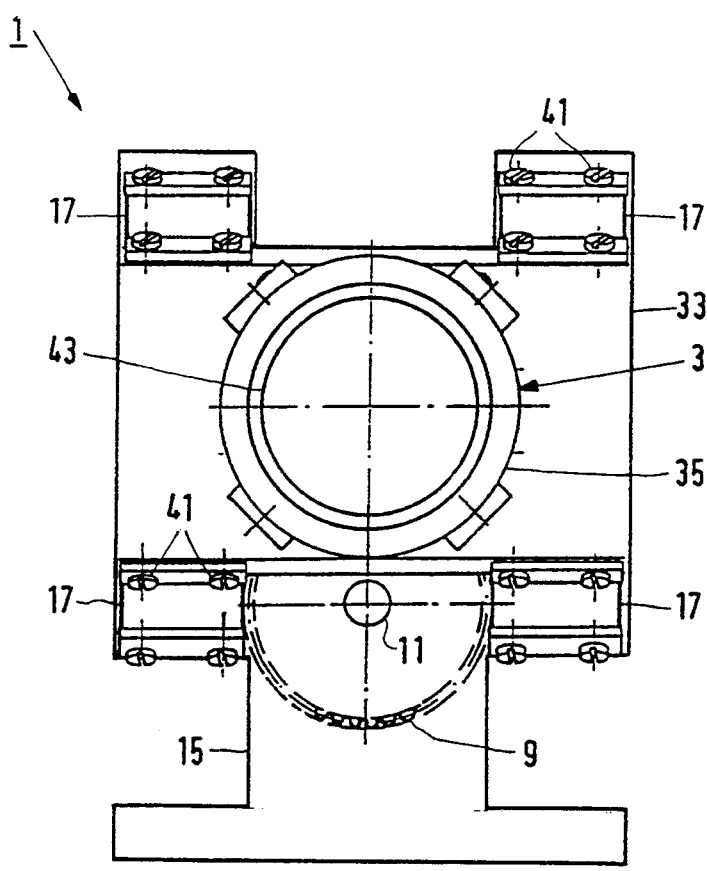
FIG. 4 shows the transmission of FIG. 2 in rear elevation.

FIGS. 2, 3 and 4 show a practical implementation of the embodiment of FIG. 1, in which comparable parts have the same reference numerals.

FIG. 2 shows that the output shaft 11 is rotatably supported in the housing 15 by ball bearings 29. The yoke 23 of the actuator 21 with the coil 25 is clearly visible, fastened with screws 26 on the housing. The armature 27 of the actuator 21 is fixedly connected to the housing 35 of the servomotor 3 by screws 28 and 32, with an interposed block 31 and a plate 33.

The motor shaft 5 with the rotor 37 is supported in the housing 35 of the servomotor 3 by ball bearings 39. The servomotor 3 is movably suspended from the housing 15 by blade springs 17 which are fastened with one end on the housing 15 and with the other end on the plate 33 by screws 41. Reference numeral 43 denotes an angular position transducer.

The electromagnetic actuator 21 is clearly depicted in FIG. 3. The positions and fastenings of the blade springs 17 are evident from FIG. 4.

Figure 5:
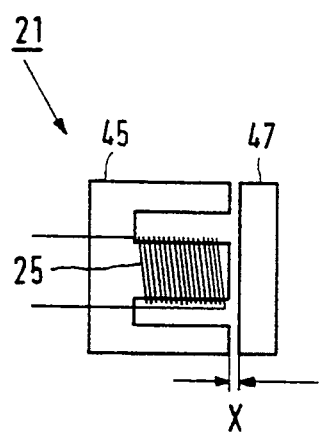
FIG. 5 shows the electromagnetic actuator used.
Figure 6:
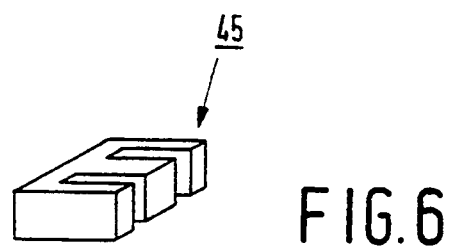
FIG. 6 shows a detail of the actuator, FIG. 7 diagrammatically shows an alternative embodiment of the transmission according to the invention.

FIG. 5 shows the actuator 21 in the form of an electromagnet of the EI type with an E-shaped yoke 45 and an i-shaped armature 47, the coil 25 being wound on the central leg of the yoke 45 and the armature 47 being clear of the yoke. The gap between the two parts is indicated with X. FIG. 6 shows the bare yoke 45 in perspective view. The two parts 45 and 47 attract one another when current is passed through the coil 25. Electromagnets of the EI type have a comparatively high force density.

Figure 7:
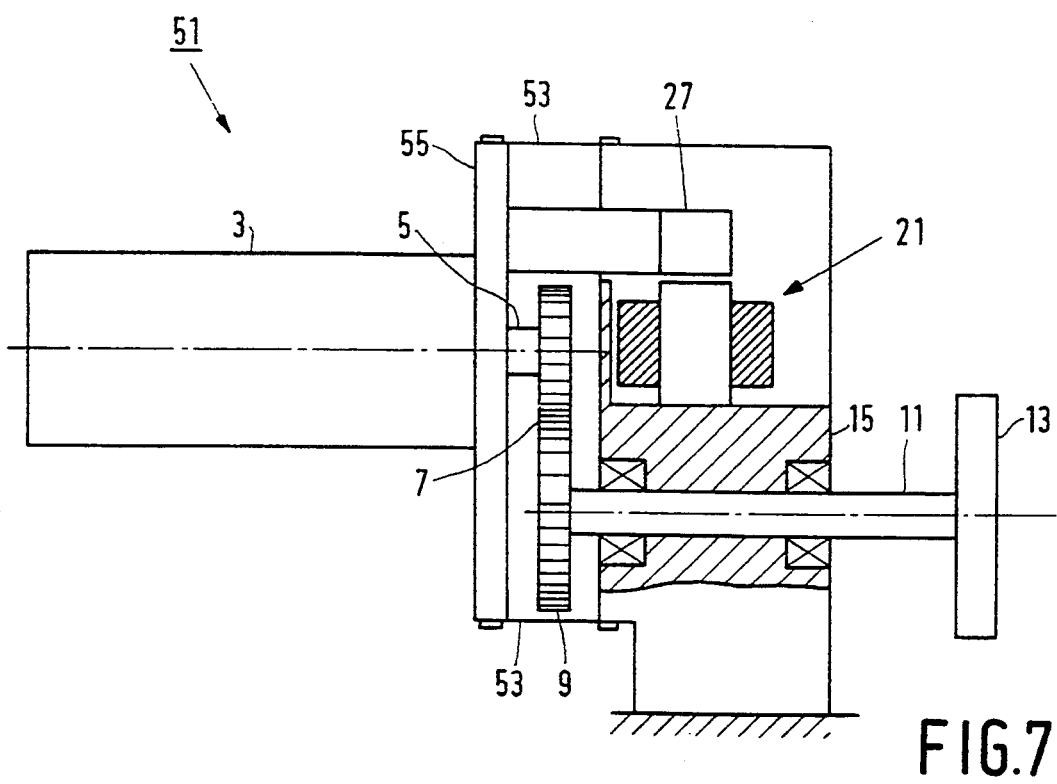

FIG. 7 diagrammatically shows another embodiment of a transmission 51 with a parallel guide for the motor shaft 5 relative to the output shaft 11. For this purpose, the servomotor 3 together with the gearwheel 7 and the armature 27 is movably coupled to the housing 15 by two or more parallel blade springs 53. The blade springs are fixed on the housing 15 and on a plate 55 which is fastened on the motor 3. The further components are similar to those of the embodiment described above and are given the same reference numerals.

Figure 8:
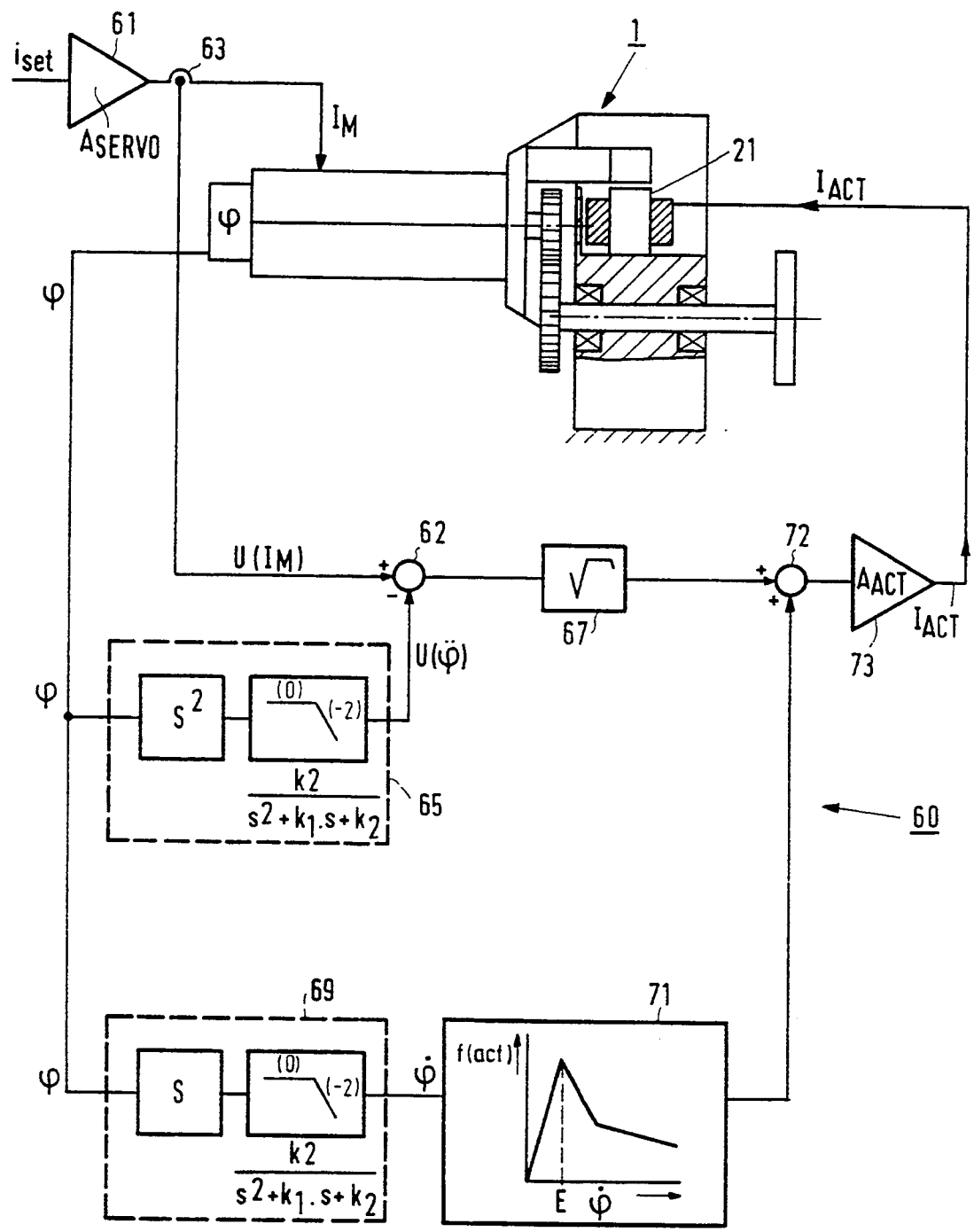
FIG. 8 shows the transmission of FIG. 1 in conjunction with a block diagram.

The control of the compression force (prestress force) by the control circuit 60 will now be explained with reference to FIG. 8. The transmission is identical to the transmission shown in FIG. 1 and is accordingly not described in any detail. An amplifier for the motor 3 is denoted with reference numeral 61. If a prestress force is to be realized as a function of the motor current, the motor current must be detected. For measuring the motor current, an LEM module LA25-NP, supplied by the firm Liaisons Electroniques Mechaniques LEM S.A., may be used for measuring the motor current. The LEM module 63 supplies a control signal which is proportional to the motor current. The LEM module has the advantage that an electrical separation between the motor current and the control circuit is provided. If prestress is provided on the basis of motor current alone, an incorrect prestress force will be applied in the dynamic case in which a certain acceleration is present, because part of the motor current is used for accelerating the rotor of the motor. To prevent this, a portion proportional to the rotor acceleration is subtracted from the obtained control signal in the differential circuit 62. The rotor acceleration is estimated by an acceleration estimation unit 65 comprising a filtered double differentiator. FIG. 8 shows the Lagrange-transformed equation of such an acceleration estimation unit in module 65. The acceleration may also be determined by an acceleration observer. The acceleration estimation unit 65 provides a signal which is a function of the rotor acceleration. This signal is subtracted from the control signal in the differential circuit 62. Reference numeral 67 denotes a root extractor circuit whose output signal is the square root of the input signal. Such a root extractor circuit is known per se from Linear Products Databook, published by Analog Devices Inc., April 1988, pp. 6-13 to 6-21. The object of this is to obtain a linear relationship between the corrected motor current and the compression force provided by the actuator. To adapt the compression force to gear tooth errors of the gearwheels, the speed is estimated by a speed estimation unit 69 having a filtered differentiator.

FIG. 8 shows the Lagrange-transformed equation of such a speed estimation unit in module 69. The speed may also be determined by a speed observer as described in "Practical Application of Second Order Observers to Electromechanical Servo systems" by J. Geerts and J. Scannel in "Journal A", vol. 31, no. 3, September 1990. The rotor speed is estimated in that the position signal of the rotor is differentiated and the differentiated signal is then filtered (low-pass). The output signal of the speed estimation unit 69 is a function of the motor speed. The output signal is supplied to a module 71 in which an empirically determined relation between the speed (horizontal axis) and the adaptation of the actuator current belonging to that speed (vertical axis) is stored. The prestress around the critical speeds of the transmission must be greater than at other speeds so as to prevent the transmission vibrating in a natural frequency. In the transmission 1 used, the transmission was found to vibrate in resonance at a critical speed E. By providing a higher compression force by the actuator around the speed E, it is possible to safeguard a sufficient prestress between the gearwheels. To reduce the natural resonance, a vibration damper may be used which is constructed, for example, from a mass mounted on the motor housing 35 with an interposed piece of rubber. The choice of the mass and the piece of rubber is made in such a way that the assembly has a resonance frequency close to the speed E. The signal provided by the module 71 is added to the signal supplied by the root extractor circuit 67 by the summation circuit 72. The output signal of the summation circuit 72 is amplified and supplied to the actuator 21 in the form of a current $I_{act}$. The correct prestress force (compression force) is then exerted by the actuator.

Experiments have shown that the invention provides substantial improvements, compared with a comparable transmission having a constant maximum prestress force of, for example, 50N: firstly, an increase in the positioning accuracy was obtained; the virtual play or hysteresis resulting from friction was halved; what remained was the hysteresis of the servomotor arising from motor bearings and carbon brushes. The angular accuracy of the output shaft is improved by a factor 80 compared with the situation with play (from 8 mrad down to 0.1 mrad). Compared with the situation involving a constant prestress force of 50N, there is an improvement in the positioning accuracy of the output shaft by a factor 6 (from 0.6 mrad down to 0.1 mrad).

Transmissions according to the invention may be used in mechanical high-precision equipment, in displacement mechanisms for samples to be analysed in X-ray spectrometers, in production machines, robots, positioning mechanisms in general, and wherever no direct-drive motors (without transmission) are available.

What is claimed is:

1. A transmission with variable prestress for driving a load, said transmission including
    toothed drive means having bearings and engaging teeth with flanks;
    a motor for driving a toothed drive means;
    toothed driven means also having bearings and engaging teeth with flanks for cooperating with the toothed drive means, wherein one of the toothed means is rotatable, and
    electromagnetic actuator means for applying a prestress force causing the toothed means to press against one another with the flanks of their mutually engaging teeth, wherein the prestress force is controlled instantaneously by the actuator in dependence on the load instantaneously applied to the transmission;
    wherein the improvement comprises:
    a stationary housing having the bearings of one of the toothed means mounted therein and;
    a block moveable relative to the stationary housing wherein the bearings of the other of the toothed means are mounted, the actuator being coupled to both the block and the stationary housing and the prestress force generated by the actuator causing the toothed means to press against one another in a radial direction.

2. The transmission as claimed in claim 1, wherein the motor includes a shaft and the transmission further comprises an output shaft positioned parallel to the motor shaft, the shafts defining a plane, and wherein the drive means includes a pinion mounted on the motor shaft and the driven means includes a gear wheel mounted on the output shaft, the motor being tiltable relative to the housing about a pivot axis, which axis is transverse to the plane defined by the shafts.

3. The transmission as claimed in claim 2, further including blade springs forming a cross spring pivot point, the motor being coupled to the stationary housing by the blade springs for enabling pivoting of the motor relative to the stationary housing about the pivot point.

4. The transmission as claimed in claim 3, wherein the electromagnetic actuator is an EI type electromagnetic actuator including an E-shaped yoke having a coil and an I-shaped armature, the E-shaped yoke and coil being fixed to the stationary housing and the I-shaped armature being fixed to the motor.

5. The transmission as claimed in claim 4, further comprising a control circuit for controlling the prestress force, the control circuit including:
    a differential circuit having means for receiving a signal representative of motor current, means for receiving a signal representative of motor acceleration, and means for determining the difference between the motor current signal and the motor acceleration signal and for providing a difference signal representative of this difference;
    a summation circuit having means for receiving the difference signal provided by the differential circuit, means for receiving a signal representative of motor speed, and means for summing the difference signal and the motor speed signal for providing a summation signal representative of this sum; and
    amplifying means for converting the summation signal provided by the summation circuit into an actuator current for energizing the actuator.

6. The transmission as claimed in claim 5, wherein the control circuit further includes a root extractor circuit coupled between the differential circuit and the summation circuit for (i) receiving the difference signal provided by the differential circuit, (ii) determining the square root of the difference signal, and (iii) providing a signal to the summation circuit representative of the square root.

7. The transmission as claimed in claim 6, further including
    an acceleration estimator unit for providing the signal representative of motor acceleration, the acceleration estimation unit having a filtered double differentiator; and
    a speed estimation unit for providing the signal representative of motor speed, the speed estimation unit having a filtered differentiator.

8. The transmission as claimed in claim 1, further comprising a control circuit for controlling the prestress force, the control circuit including:
    a differential circuit having means for receiving a signal representative of motor current, means for receiving a signal representative of motor acceleration, and means for determining the difference between the motor current signal and the motor acceleration signal and for providing a difference signal representative of the difference;
    a summation circuit having means for receiving the difference signal provided by the differential circuit, means for receiving a signal representative of motor speed, and means for summing the difference signal and the motor speed signal and for providing a summation signal representative of this sum; and
    amplifying means for converting the summation signal provided by the summation circuit into an actuator current for energizing the actuator.

9. The transmission as claimed in claim 8, wherein the control circuit further includes a root extractor circuit coupled between the differential circuit and the summation circuit for (i) receiving the difference signal provided by the differential circuit, (ii) determining the square root of the difference signal, and (iii) providing a signal to the summation circuit representative of the square root.

10. The transmission as claimed in claim 9, further including
    an acceleration estimator unit for providing the signal representative of motor acceleration, the acceleration estimation unit having a filtered double differentiator; and
    a speed estimation unit for providing the signal representative of motor speed, the speed estimation unit having a filtered differentiator.

11. A transmission with variable prestress for driving a load, said transmission comprising:
- a first support;
- a first toothed drive element rotatably supported in said first support and rotatable about a first axis of rotation;
- a second support;
- a second toothed drive element for engaging said first toothed drive element, said second toothed drive element being rotatably supported in said second support about a second axis of rotation substantially parallel to said first axis of rotation;
- a cross spring pivot comprising blade springs connected to said first and second supports, said cross spring pivot pivotably connecting said supports for pivotal movement relative to each other about a third axis perpendicular to said first and second axis for rotation so that said first and second drive elements are moveable relative to each other in a plane through said first and second axis of rotation; and
- actuating means for pivoting said supports and said drive elements relative to each other about said third axis thereby adjusting the prestress between said first and second toothed drive elements.

12. A transmission according to claim 11, wherein:
said first toothed drive element comprises an input shaft and pinion mounted thereon and said first support comprises an electric motor for rotatably driving said input shaft and pinion; and
said second toothed drive element comprises an output shaft and a gearwheel mounted thereon.

13. A transmission according to claim 12, wherein:
said second housing is stationary; and
said actuator is an electromagnetic actuator of the EI type with an E-shaped yoke having a coil and an I-shaped armature, the E-shaped yoke and coil being fixed to said stationary second housing and the I-shaped armature being fixed to said motor, the E-shaped yoke and coil fixed to the stationary second housing including electrical connection means for connection to a control circuit and said I-shaped armature fixed to said movable motor being free of electrical connectors.

14. A transmission according to claim 11, wherein:
said second housing is stationary; and
said actuator is an electromagnetic actuator including an electromagnetic actuator, a yoke having a coil and an armature, the yoke and coil being fixed to said stationary, second housing and the I-shaped armature being fixed to said first housing, the yoke and coil fixed to the stationary second housing including electrical connection means for connection to a controller and said I-shaped armature fixed to said movable first housing being free of electrical connectors.

15. A transmission with variable prestress for driving a load, the transmission, comprising:
- a first toothed drive element and first means for rotatably supporting said first toothed drive element for rotation about a first axis of rotation;
- a second toothed drive element for drivably engaging said first toothed drive element and means for rotatably supporting said second toothed drive element about a second axis of rotation substantially parallel to said first axis of rotation;
- means comprising an electromagnetic actuator for moving said first and second drive element radially with respect to each other to vary the prestress force between the toothed drive elements during rotation thereof;
- a motor for rotatably driving the first toothed drive element, and
- a control circuit for controlling the prestress force, the control circuit including
  i) a differential circuit having means for receiving a signal representative of motor current, means for receiving a signal representative of motor acceleration, and means for determining the difference between the motor current signal and the motor acceleration signal and for providing a difference signal representative of this difference;
  ii) a summation circuit having means for receiving the difference signal provided by the differential circuit, means for receiving a signal representative of motor speed, and means for summing the difference signal and the motor speed signal for providing a summation signal representative of this sum; and
  iii) amplifying means for converting the summation signal provided by the summation circuit into an actuator current for energizing the actuator.

16. The transmission as claimed in claim 15, wherein the control circuit further includes a root extractor circuit coupled between the differential circuit and the summation circuit for (i) receiving the difference signal provided by the differential circuit, (ii) determining the square root of the difference signal, and (iii) providing a signal to the summation circuit representative of the square root.

17. The transmission as claimed in claim 16, further including
an acceleration estimator unit for providing the signal representative of motor acceleration, the acceleration estimation unit having a filtered double differentiator; and
a speed estimation unit for providing the signal representative of motor speed, the speed estimation unit having a filtered differentiator.

* * * * *